Patented Dec. 26, 1939

2,185,115

UNITED STATES PATENT OFFICE 2,185,115

ZEIN SOLUTION AND COATING COMPOSITION

Roy E. Coleman, Chicago, Ill., assignor to The Zein Corporation of America, a corporation of Delaware No Drawing. Original application September 21, 1939, Serial No. 295,919. Divided and this application October 11, 1939, Serial No. 298,989

11 Claims. (Cl. 134—12)

This invention relates to improvements in substantially anhydrous solutions and coating compositions of zein and to methods of preparing the same. While the present invention is applicable to the production of solutions and coating compositions of other prolamins, it is particularly directed to securing substantially anhydrous solutions and coating compositions of zein with controlled solution and gelling characteristics, zein being differentiated from other prolamins by its unusual gelling tendencies.

This application is a division of my prior co-pending application Serial No. 295,919, filed Sept. 21, 1939.

The solutions and coating compositions of my present invention are characterized by the fact that they contain either no added water or only very slight amounts of water not in excess of about 5% and are, therefore, substantially anhydrous.

The zein used in accordance with my invention may be the commercial zein which contains a small percentage of moisture in the order of about 5 to about 8%, preferably about 8%, and is obtained in the trade in powdered form, or it may be a specially treated substantially anhydrous zein. In the following description of my invention I refer by the term "zein" to commercial zein or to zein of substantially the water content of commercial zein unless otherwise specifically designated.

In the prior art zein coating compositions, water has been included to a substantial extent, it being considered that the solubility characteristics of zein required the inclusion of substantial proportions of water in organic solvents. For example, as stated in the Walsh et al. Patent No. 1,966,604, the addition of water is necessary since the low-molecular weight alcohols, alcohol ethers and alcohol derivatives are not effective alone in making solutions of zein.

In accordance with the present invention I have found that non-separating, stable liquid coating compositions of controlled gelling characteristics, either slow gelling or substantially non-gelling, can be prepared from zein by the aid of anhydrous or substantially anhydrous solvents or mixtures of such solvents. These coating compositions, over wide range of concentrations, are stable on standing at temperatures of 80° F. and below and do not separate even when cooled to temperatures of 50 to 70° F. and somewhat below. When cooled even to temperatures as low as 10° above zero or to zero, solutions or coatings prepared in accordance with the present invention may separate and become solid; however, on heating again to temperatures of from about 45° to 70° F., a re-solution is effected, either without stirring or with slight stirring, and the solutions and coatings return to their normal form at the re-heating temperatures.

The stable non-separating solutions and coating compositions prepared in accordance with the present invention may be controlled as to their gelling characteristics, as hereinafter set forth, and may be slow gelling or substantially non-gelling with slight tendency to increase in viscosity; that is, to thicken or become heavier in body; and in many instances they exhibit practically no tendency to thicken or to gel over practical periods of time in the order of about 3 to about 6 months. By virtue of these novel stable characteristics, the solutions and coatings of my invention are not limited to use immediately or within short periods of time after preparation as is generally the case with the prior art solutions and coating compositions. The solutions and coating compositions of the present invention generally remain stable and reasonably constant in their characteristics during the periods necessary for transportation and distribution, either in bulk or in packages, or for storage for reasonable periods of time, and hence their field of applicability is greatly increased.

In accordance with the present invention, I have found that solutions and coatings of zein having the desired non-separating, controlled gelling or non-gelling characteristics may be secured by a suitable balance between the hydrocarbon constituents or radicals present in the solvent or solvent mixtures and the polar constituents or radicals present therein, the presence of a certain proportion of carbon-bonded hydroxyl radicals being required to secure solvent action. The presence of a hydroxyl group in a primary alcohol radical, —$CH_2OH$, appears to be particularly helpful in securing such action. The presence of an excessive proportion of hydroxyl radicals or of polar radicals including some hydroxyl radicals causes or accelerates gelling tendencies in the zein solution or coating. Polar radicals such as —O— (ether oxygen), —Cl, —$NH_2$, =CO and —COOH thus appear to aid or cooperate with —OH in securing the necessary conditions of polarity in the solvent (in which term I include solvent mixtures in the present case) for solvent action, and in excess produce the conditions enhancing gelling. While in solutions absence of gelling or slow gelling or thickening is desirable, in the preparation of plastics rapid gelling may be desirable. In the present case I am more particularly concerned with solutions having slow gelling or substantially non-gelling characteristics for use in coating compositions; i. e. solutions which do not gel or which gel or thicken so slowly as to permit normal commercial handling without material or serious thickening or gelling.

The proportion of hydrocarbon or non-polar radicals in the solvent or solvent mixture should not be excessive, since too high a proportion of hydrocarbon apparently causes insolubility and separation of the zein. The same is the case in the presence of excessively long or large hydrocarbon radicals; e. g. $C_4$ and higher alkyl radicals. Cyclic hydrocarbon radicals, however, behave as lower alkyl radicals. Thus, as will appear hereinafter, the benzyl radical acts as if it were intermediate between the methyl and ethyl radicals. This is consistent with the polar characteristics of aryl-alkyl radicals as compared with alkyl-alkyl radicals.

The desired balance of polar constituent radicals and hydrocarbon or non-polar radicals in the solvent may be secured by the use of a suitable individual compound which inherently has the necessary balance, or by an admixture of compounds which are individually not balanced to secure proper relations in the mixture and which individually may not be solvents for zein. The behavior of such mixtures may be explained by assuming solvation of the zein molecules or micelles by the hydroxylated constituents of the mixture, the orientation of the hydrocarbon radicals of the hydroxylated compound to the exterior of the solvate complex, which may then disperse or dissolve in the remaining constituents of the solvent.

The proportion of polar radicals to hydrocarbon or non-polar radicals which I have found to be desirable lies within a range which extends between the limits of absolute methanol on the one hand, having 53% hydroxyl and 47% hydrocarbon, and absolute ethanol on the other hand having 37% hydroxyl and 63% hydrocarbon. This range is approximate and may vary somewhat depending on the solvent or solvent mixture used. The limits of this range are, however, indicative of gelling characteristics on the one hand and of insolubility on the other and, therefore, provides a close and adequate guide to enable the operator, by simple experimentation, to determine the required balance of polar and hydrocarbon radicals to effect solution of zein in any solvent or mixture of solvents of a character herein set forth. Thus absolute methanol has decided solvent action, but has excessive gelling tendencies, as has also ethylene glycol, which has an even higher proportion of —OH than has methanol. Glycerol, also higher in —OH than methanol, shows no appreciable solvent action on zein, a behavior which is probably related to its high surface tension. On the other hand, absolute ethanol, isopropanol, and higher alcohols have no apparent solvent action.

It is, of course, obvious that certain solvents or mixtures of solvents having a balance of polar and hydrocarbon radicals within the limits above set forth will produce solutions or coatings which are more suitable for special commercial purposes than other balanced solvents or balanced mixtures of solvents. By using the critical polar-hydrocarbon radical balance range as a guide, it is possible, by simple experimentation, to determine readily that particular balanced solvent or balanced mixture of solvents which will produce the solution or coating composition having the desired properties and characteristics for the special purpose.

Various relatively high molecular weight alcohols, having a ratio of polar to non-polar radicals between methanol and ethanol, are excellent individual solvents for zein with the production of non-gelling, non-separating solutions and coatings, as set forth in my prior applications Serial No. 187,559, Serial No. 187,560, and Serial No. 188,182, which were filed as continuations-in-part of application Serial No. 158,215. The solvents of these applications include diethylene glycol, triethylene glycol, propylene glycol, diacetone alcohol, benzyl alcohol, cyclohexanol and furfuryl alcohol, as well as tetrahydrofurfuryl alcohol and the like. These solvents individually, or mixtures thereof, are capable of dissolving zein to produce solutions or coating compositions which are stable against separation and are controlled to be slow gelling or substantially non-gelling over practical periods of time; in many cases over from about 3 to about 6 months. In the case of diacetone alcohol and cyclohexanol, for example, very small proportions of water, say 1 to 3%, or of methanol or glycol may be incorporated therewith to form zein solutions of reduced viscosities.

Considering the cyclic and aryl-alkyl radicals of the compounds benzyl alcohol, cyclohexanol, furfuryl and tetrahydrofurfuryl alcohols, for example, as intermediate between the $CH_3$— and the $CH_3CH_2$— radicals, it will be noted that in all of these solvents the proportion of polar radicals (—OH or —OH and —O—) may be regarded as if it were intermediate between the ratios for methanol and ethanol. I have found that any of the above balanced solvents or mixtures of them may be used in or added to other solvents or solvent mixtures, otherwise balanced or approximately balanced, such additions being frequently desirable. Thus, benzyl alcohol aids in securing a bright clear zein film. In general, also, these solvents may be used with various proportions of ethanol, glycol or the like, providing the ratio of hydroxyl and other polar groups to hydrocarbon radicals is maintained within the proper balance, as set forth in the following examples.

In the following examples, when I refer to anhydrous denatured alcohol I have reference to the commercial anhydrous denatured alcohol of the following formula:

| | Per cent |
|---|---|
| Anhydrous ethyl alcohol | approximately 89.3 |
| Anhydrous methyl alcohol | do 4.4 |
| Ethyl acetate | do 6.3 |

In these examples and in all other examples herein, the term "parts" indicates parts by weight.

Example 1

10 parts of zein are mixed with 40 parts of a solvent mixture containing 84% of 95% alcohol and 16% of diethylene glycol. The mixture is stirred and on the application of heat in the order of about 85 to 95° F. for about 5 minutes, a clear non-separating, substantially non-gelling stable solution of the zein is formed.

Example 2

10 parts of zein are mixed with 20 parts of a solvent mixture containing 50% of benzyl alcohol and 50% of 95% alcohol. On stirring and with the application of heat in the order of about 108 to 112° F. a non-separating, substantially non-gelling stable solution of the zein in the solvent mixture is obtained in about 5 to 8 minutes.

Example 3

10 parts of zein are mixed with 20 parts of a solvent mixture containing 50% of benzyl alcohol and 50% of anhydrous denatured alcohol. On stirring and with the application of heat in the order of about 90 to 110° F., a non-separating, substantially non-gelling stable solution of the zein in the solvent mixture is obtained in about 5 to 8 minutes.

Example 4

10 parts of zein are mixed with 35 parts of a solvent mixture containing 22.2% of diethylene glycol monomethyl ether and 77.8% of cyclohexanol. On stirring and with the application of heat in the order of about 165 to 170° F., a stable, slow-gelling solution is obtained in about 8 to 12 minutes.

Example 5

10 parts of zein are mixed with 25 parts of diethylene glycol monoethyl ether and 15 parts of propylene glycol in a suitable vessel. On stirring and with the application of heat in the order of about 120 to 140° F., a stable, slow gelling solution is obtained in about 5 to 10 minutes.

Example 6

10 parts of zein are mixed with 20 parts of diethylene glycol monoethyl ether and 20 parts of benzyl alcohol in a suitable vessel. On stirring and with the application of heat in the order of about 110° to 120° F., a stable, slow gelling solution is obtained in about 10 to 12 minutes.

Example 7

10 parts of zein are mixed with 20 parts of diethylene glycol monoethyl ether and 30 parts of diacetone alcohol in a suitable vessel. On stirring and with the application of heat in the order of about 135° to 145° F., a stable, slow gelling solution is obtained in about 5 to 10 minutes.

Example 8

10 parts of zein are mixed with 20 parts of diethylene glycol monoethyl ether, 12 parts of triethylene glycol and 8 parts benzyl alcohol in a suitable vessel. On stirring and with the application of heat in the order of about 120° to 130° F., a stable, slow gelling solution is obtained in about 8 to 12 minutes.

Example 9

10 parts of zein are mixed with 40 parts of a solvent mixture containing 90% of diethylene glycol and 10% of anhydrous denatured alcohol. In practice the zein is heated with the diethylene glycol to a temperature in the order of about 190 to 195° F. to form a solution. The solution is permitted to cool to about 130 to 135° F., at which temperature the anhydrous denatured alcohol is added. The resulting solution is non-separating and substantially non-gelling.

Example 10

10 parts of zein are mixed with 80 parts of a solvent mixture containing 50% of diacetone alcohol and 50% of 95% alcohol. In practice, the zein is mixed with the diacetone alcohol and heated to about 190 to 200° F. for about 8 to 12 minutes to effect solution. The solution is then cooled to about 130 to 140° F. and the 95% alcohol is then added. The resulting solution is non-separating and substantially non-gelling.

Example 11

10 parts of zein are mixed with 200 parts of a solvent mixture containing 40% of propylene glycol and 60% to 95% alcohol. In practice, the zein is heated in the propylene glycol to about 165° to 170° F. to effect solution. The solution is then cooled to about 130° F. and the 95% alcohol is then added. The resulting solution is non-separating and substantially non-gelling.

Example 12

10 parts of zein are mixed with 20 parts of ethylene glycol and 20 parts of diethylene glycol. On stirring and with the application of heat in the order of about 185° to 195° F., a clear, non-separating, substantially non-gelling stable solution of the zein in the solvent mixture is obtained in about 8 to 12 minutes.

Example 13

10 parts of zein are mixed with 20 parts of benzyl alcohol and 20 parts of ethylene glycol in a suitable vessel. On stirring and with the application of heat in the order of about 130° to 150° F., a stable, slow gelling solution is obtained in about 5 to 10 minutes.

Example 14

10 parts of zein are mixed with 70 parts of propylene glycol and 30 parts of glycerine in a suitable vessel. On stirring and with the application of heat in the order of about 140 to 160° F., a stable, slow gelling solution is obtained in about 8 to 12 minutes.

Example 15

10 parts of zein are mixed with 48 parts of diacetone alcohol and 12 parts of ethylene glycol in a suitable vessel. On stirring and with the application of heat in the order of about 160° to 170° F., a stable, slow gelling solution is obtained in about 5 to 10 minutes.

Example 16

10 parts of zein are mixed with 32 parts of triethylene glycol and 8 parts of glycerine in a suitable vessel. On stirring and with the application of heat in the order of about 120° to 130° F., a stable, slow gelling solution is obtained in about 10 to 12 minutes.

Solvent mixtures of non-gelling or controlled gelling characteristics may be produced by mixing miscible compounds having a deficiency of hydroxyl or polar radicals with compounds having a balance or an excess thereof to secure the desired balance of polar and hydrocarbon radicals in the resulting mixtures. An extreme example of the production of such solvents is the admixture of toluene (a non-solvent for zein) and methanol. Mixtures of methanol and toluol containing 5 to 45% of toluol are excellent solvents for zein, and have retarded and in some cases relatively slow gelling tendencies. The preferred range is 35 to 45% toluol. The following examples are illustrative of such mixtures. By the expression "retarded gelling tendencies" as used in these examples and elsewhere throughout the specification, I mean solutions of zein in solvent mixtures which have retarded gelling tendencies with respect to the gelling time of solutions of zein in the constituent of the mixture of solvents having a tendency to form a gelling zein solution.

Example 17

10 parts of zein are mixed with 40 parts of a mixture consisting of about 55% of methanol and about 45% of toluol. On stirring and with the application of heat in the order of about 100 to 105° F., a non-separating, stable solution of the zein in the solvent mixture having greatly retarded gelling tendencies is obtained.

Example 18

10 parts of zein are mixed with 24 parts of anhydrous isopropyl alcohol and 6 parts of C. P. glycerine in a suitable vessel. On stirring and with the application of heat in the order of about 115 to 125° F., a non-separating, slow-gelling, stable solution of the zein in the solvent mixture is obtained.

Example 19

10 parts of zein are mixed with 30 parts of ethylene glycol monomethyl ether and 10 parts of toluol in a suitable vessel. On stirring and with the application of heat in the order of about 140 to 145° F., a non-separating, stable solution of the zein in the solvent mixture is obtained having greatly retarded gelling tendencies.

Example 20

10 parts of zein are mixed with 18 parts of methanol and 22 parts of benzol in a suitable vessel. On stirring and with the application of heat in the order of about 90 to 110° F., a non-separating stable solution of the zein in the solvent mixture having retarded gelling tendencies is obtained.

Example 21

10 parts of zein are mixed with 125 parts of a solvent mixture containing 40% of cyclohexanol, 40% of 95% alcohol, 10% of toluol, and 10% of linseed fatty acids. In practice, the zein is heated in the cyclohexanol to about 190° to 200° F., to effect solution. The solution is then cooled to about 130° F., and the other ingredients are added. The solution formed is stable and non-gelling.

Anhydrous or substantially anhydrous solvents may be prepared from the aliphatic alcohols having from 2 to 4 carbon atoms by adding thereto hydroxylated or polar compounds having higher ratios of —OH or polar groups (including —CO, —NH₂, —O— or —OH) than ethanol to secure the desired balanced relations between polar and non-polar groups. The simplest mono- and polyhydric alcohols are particularly useful in this connection, these being methanol, glycol and glycerol. The following examples are illustrative of zein solutions prepared with such solvent mixtures in accordance with my invention.

Example 22

10 parts of zein are mixed with 40 parts of a solvent mixture containing 86% of 95% alcohol and 14% of ethylene glycol. The mixture is stirred and on the application of heat in the order of about 90 to 95° F., a clear, non-separating, slow-gelling, stable solution of the zein in the solvent mixture is formed.

Example 23

10 parts of zein are mixed with 40 parts of a solvent mixture containing 89% of 95% alcohol and 11% of dichlorethyl ether. On stirring and with the application of heat in the order of about 75 to 85° F., a non-separating, substantially slow-gelling, stable solution of the zein in the solvent mixture is obtained.

Example 24

10 parts of zein are mixed with 44 parts of 95% alcohol and 6 parts of dioxan in a suitable vessel. The mixture is stirred and on the application of heat in the order of 75 to 85° F., a stable, non-separating, slow-gelling solution of the zein is produced.

Example 25

10 parts of zein are mixed with 30 parts of a solvent mixture containing 50% of ethylene glycol monomethyl ether and 50% of anhydrous denatured alcohol. On stirring and with the application of heat in the order of 80 to 85° F., a stable non-separating, slow-gelling solution is obtained.

Example 26

10 parts of zein are mixed with 40 parts of a solvent mixture containing 84% anhydrous denatured alcohol and 16% of ethylene glycol. The mixture is stirred and on the application of heat in the order of about 90 to 95° F., a clear, non-separating, slow-gelling, stable solution of zein in the solvent mixture is obtained.

Example 27

10 parts of zein are mixed with 30 parts of anhydrous isopropyl alcohol and 20 parts of C. P. glycerine in a suitable vessel. On stirring and with the application of heat in the order of about 115 to 125° F., a non-separating, slow-gelling, stable solution of the zein in the solvent mixture is obtained.

Example 28

10 parts of zein are mixed with 25 parts of 95% isopropyl alcohol and 5 parts of ethylene glycol in a suitable vessel. On stirring and with the application of heat in the order of about 110 to 120° F., a non-separating, slow-gelling, stable solution of the zein in the solvent mixture is obtained.

It is apparent that ethylene dichloride, tetrachlorethylene and the like may be used in lieu of dichlorethyl ether in the above examples. It is also apparent, in accordance with the present invention, that the proportions of these materials used in admixture with the low molecular weight alcohols must be controlled so that the desired balanced relations between polar and non-polar groups are secured.

The solvents and solvent mixtures for zein set forth above, as well as other solvents or solvent mixtures which will be apparent from the foregoing, and the resulting solutions prepared in accordance with the present invention are substantially anhydrous, containing not more than 5% of added water and, preferably, substantially less. The proportions of water permissible are thus limited in order to secure the desired solution characteristics and control of gelling, since it has been found that the presence of water in excess of the proportions above indicated disturbs the balance of the solvent, tending to produce or to accelerate gelling, as well as to impair the character of the zein film deposited from the solution. Possible explanations of the behavior of water may be made on the basis that it acts as a highly polar constituent when present in solution in excess, that it tends to cause solvation or hydration of the zein, and its tendency to cause gelling may also be related to its high surface tension. The permissible proportion may vary in various solvents or solvent mixtures, the maximum permissible being represented by the permissible proportion of 5% in the case of ethyl alcohol or the ethyl alcohol constituent of the solvent. Since ethyl alcohol with 5% water is a solvent producing stable solution in only limited cases, as set forth in my application Serial No. 158,215, and in all other instances is but one constituent of a mixture, it will be apparent that the solvents prepared in accordance with the present invention contain (except in those specific instances) substantially less than 5% of added water.

The extent of the effect of water and the permissible proportion thereof varies with the solvent or solvent mixture and, in general, the more closely the solvent or solvent mixture approaches the desired balance of polar groups and hydrocarbon constituents, the less the permissible proportion of water to avoid the introduction of excessive gelling or insolubility. In some cases small proportions of water below the limits above set forth may be advantageous. The maximum permissible proportion may be readily determined experimentally in each instance and in many cases may be as low as 2 or 3%.

By the term "substantially anhydrous", in connection with solvents or solvent mixtures, as used herein, I mean having insufficient water in the solvent or solvent mixture to disturb the balance thereof and introduce excessive gelling or insolubility, and having in no case more than 5% water.

By the use of anhydrous or substantially anhydrous solvents or solvent mixtures in accordance with my invention, I am thus enabled to prepare substantially non-aqueous zein solutions and coating compositions which contain no added water, or only slight amounts thereof, not in excess of 5% and, preferably, less. By virtue of this low added water content, the field of applicability of the coating compositions and solutions in accordance with my invention is materially widened beyond that of the aqueous coating compositions of the prior zein art. In addition, the films deposited from my coating compositions and solutions have none of the serious drawbacks as to brittleness, lack of luster and gloss and blooming and blushing tendencies of the films deposited from the aqueous solutions or coating compositions of the prior art.

Certain anhydrous or substantially anhydrous compounds or mixtures of compounds in accordance with my invention, characterized in having a balance of polar and hydrocarbon radicals approaching that of ethanol and bordering the desired range, have been found to be excellent solvents for zein. Solutions or coating compositions formed by the aid of these solvents are stable against separation of the zein and produce solutions in which the gelling tendencies can be more readily controlled than in the case of solutions or coating compositions formed by the aid of these solvents and substantial amounts of water as in the prior art. Of the solvents, mention may be made of ethylene glycol monomethyl ether, diethylene glycol monomethyl ether, ethylene glycol monoethyl ether, diethylene glycol monoethyl ether and like alcohol-ether solvents or mixtures thereof.

The quantity of anhydrous or substantially anhydrous solvents or mixtures of solvents necessary to prepare the desired solutions or coating compositions in accordance with my invention may vary rather widely from about 2 to 20 or more and, preferably, from about 2 to about 9 or more parts by weight of the solvent to 1 part by weight of the zein. In most instances, 3 to 5 parts by weight of the solvent to 1 part by weight of the zein has been found sufficient to dissolve the zein and form the desired stable solutions or coating compositions. The viscosity and gelling tendencies of the solutions or coating compositions prepared in accordance with my invention are at least in part dependent on the proportion of solvent used.

The coating compositions embodying my invention have the unusual properties, particularly when heated, of being able to "give up" their solvent or solvents readily when applied to any surface to quickly and readily form tough, flexible, non-tacky, hard and generally transparent films even when retaining some solvent. The films deposited from coating compositions in accordance with my invention are very strong and have unusual adherent properties. In these coating compositions the film forming properties thereof can be built up to produce a film of greater toughness, flexibility, hardness and gloss than is capable of being formed from coating compositions containing added water in an amount greater than 5% as in the prior art. Under normal temperature conditions, the solutions or coating compositions in accordance with my invention will produce non-blushing coatings on drying, without the aid of supplementary anti-blushing agents as in the prior art.

The coating compositions in accordance with my invention may be applied to any surface and they may be used for coating, sizing, or impregnating any material, such as paper, textiles, wood, wood, pulp and the like. When coated on paper, Cellophane, glass and the like, a film is formed almost immediately which possesses the film characteristics set forth above. Since these coating compositions have decided adhesive properties, they may be used either per se or in combination with other materials for uniting or laminating paper, cloth, wood, glass, felt, Cellophane, metals and metal foils and the like.

The characteristics of the coating compositions in accordance with my invention, and hence of the ultimate films formed therefrom, can be altered at will and as desired by the inclusion of diluents, modifiers, plasticizers, resins, cellulose derivatives, fillers and the like, all as set forth in my application Serial No. 295,919, Case No. 22.

I claim:

1. A substantially non-aqueous liquid coating composition comprising a solution of zein in an anhydrous mixture of solvents comprising an organic compound having a proportion of polar to non-polar radicals which is greater than the proportion of polar to non-polar radicals of ethanol and an aliphatic alcohol having from 2 to 4 carbon atoms, said composition containing less than 5% of added water, and being stable against separation of the zein at temperatures of 70° F. and being relatively non-gelling.

2. A substantially non-aqueous liquid coating composition comprising a solution of zein in an anhydrous mixture of solvents having a proportion of polar to non-polar radicals which lies within a range extending between the limits of the proportion of polar to non-polar radicals of methanol and the proportion of polar to non-polar radicals of ethanol, said mixture of solvents comprising an organic compound having a proportion of polar to non-polar radicals which is greater than the proportion of polar to non-polar radicals of ethanol and an aliphatic alcohol having from 2 to 4 carbon atoms, said composition containing less than 5% of added water, and being stable against separation of the zein at temperatures of 70° F. and being relatively non-gelling.

3. A substantially non-aqueous liquid coating composition comprising a solution of zein in an anhydrous mixture of solvents having a proportion of polar to non-polar radicals which lies within a range extending between the limits of the proportion of polar to non-polar radicals of methanol and the proportion of polar to non-polar radicals of ethanol, said mixture of solvents comprising an organic compound having a proportion of polar to non-polar radicals which is greater than the proportion of polar to non-polar radicals of ethanol and an aliphatic alcohol of the class consisting of anhydrous ethanol and anhydrous isopropanol, said composition containing less than 5% of added water, and being stable against separation of the zein at temperatures of 70° F. and being relatively non-gelling.

4. A substantially non-aqueous liquid coating composition comprising a solution of a prolamin in an anhydrous mixture of solvents having a proportion of polar to non-polar radicals which lies between the limits of the proportion of polar to non-polar radicals of methanol and the proportion of polar to non-polar radicals of ethanol, said mixture of solvents comprising an organic compound having a proportion of polar to non-polar radicals which is greater than the proportion of polar to non-polar radicals of ethanol and an aliphatic alcohol having from 2 to 4 carbon atoms, said composition containing less than 5% of added water, and being stable against separation of the prolamin at temperatures of 70° F. and being relatively non-gelling.

5. A substantially non-aqueous liquid coating composition comprising a solution of zein in an anhydrous mixture of solvents having a proportion of polar to non-polar radicals which lies within a range extending between the limits of the proportion of polar to non-polar radicals of methanol and the proportion of polar to non-polar radicals of ethanol, said solvent mixture being composed of solvents which individually are non-solvents for zein, said composition containing less than 5% of added water, and being stable against separation of the zein at temperatures of 70° F. and being relatively non-gelling.

6. A substantially non-aqueous liquid coating composition comprising a solution of zein in an anhydrous mixture of solvents having a proportion of polar to non-polar radicals which lies within a range extending between the limits of the proportion of polar to non-polar radicals of methanol and the proportion of polar to non-polar radicals of ethanol, said solvent mixture comprising anhydrous ethanol and ethylene glycol, said composition containing less than 5% of added water, and being stable against separation of the zein at temperatures of 70° F. and being relatively non-gelling.

7. A substantially non-aqueous liquid coating composition comprising a solution of zein in an anhydrous mixture of solvents having a proportion of polar to non-polar radicals which lies within a range extending between the limits of the proportion of polar to non-polar radicals of methanol and the proportion of polar to non-polar radicals of ethanol, said mixture of solvents comprising anhydrous denatured alcohol and ethylene glycol, said composition containing less than 5% of added water, and being stable against separation of the zein at temperatures of 70° F. and being relatively non-gelling.

8. A substantially non-aqueous liquid coating composition comprising a solution of zein in an anhydrous mixture of solvents having a proportion of polar to non-polar radicals which lies within a range extending between the limits of the proportion of polar to non-polar radicals of methanol and the proportion of polar to non-polar radicals of ethanol, said mixture of solvents comprising isopropyl alcohol and glycerine, said composition containing less than 5% of added water, and being stable against separation of the zein at temperatures of 70° F. and being relatively non-gelling.

9. A substantially non-aqueous liquid coating composition comprising a solution of zein in an anhydrous mixture of solvents having a proportion of polar to non-polar radicals which lies within a range extending between the limits of the proportion of polar to non-polar radicals of methanol and the proportion of polar to non-polar radicals of ethanol, said mixture of solvents comprising ethylene glycol monomethyl ether and anhydrous denatured alcohol, said composition containing less than 5% of added water, and being stable against separation of the zein at temperatures of 70° F. and being relatively non-gelling.

10. The method of preparing a substantially non-aqueous zein solution containing less than 5% of added water which is stable against separation of the zein at temperatures of 70° F. and which is relatively non-gelling, comprising mixing an organic compound having a proportion of polar to non-polar radicals which is greater than the proportion of polar to non-polar radicals of ethanol with an anhydrous aliphatic alcohol having from 2 to 4 carbon atoms to form a solvent mixture having a proportion of polar to non-polar radicals which lies within a range extending between the limits of the proportion of polar to non-polar radicals of methanol and the proportion of polar to non-polar radicals of ethanol and dissolving zein in said solvent mixture to form said solution, said solvent mixture containing no added water.

11. The method set forth in claim 10 wherein the solvents of said solvent mixture are individually non-solvents for zein.

ROY E. COLEMAN.